(12) United States Patent
Lee

(10) Patent No.: US 11,310,488 B2
(45) Date of Patent: Apr. 19, 2022

(54) METHOD OF OPERATING AN IMAGE SENSOR, IMAGE SENSOR PERFORMING THE SAME, AND ELECTRONIC SYSTEM INCLUDING THE SAME

(71) Applicant: SAMSUNG ELECTRONICS CO., LTD., Suwon-si (KR)

(72) Inventor: Hyeok-Jong Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/018,120

(22) Filed: Sep. 11, 2020

(65) Prior Publication Data

US 2020/0413037 A1 Dec. 31, 2020

Related U.S. Application Data

(63) Continuation of application No. 16/361,783, filed on Mar. 22, 2019, now Pat. No. 10,812,787.

(30) Foreign Application Priority Data

Aug. 28, 2018 (KR) .......................... 10-2018-0101575

(51) Int. Cl.
*H04N 17/00* (2006.01)
*H04N 5/369* (2011.01)
*H04N 5/374* (2011.01)

(52) U.S. Cl.
CPC ......... *H04N 17/002* (2013.01); *H04N 5/3698* (2013.01); *H04N 5/374* (2013.01)

(58) Field of Classification Search
CPC ...... H04N 5/378; H04N 5/343; H04N 5/3575; H04N 5/37455; H04N 17/002;
(Continued)

(56) References Cited

U.S. PATENT DOCUMENTS 6,226,764 B1 5/2001 Lee
7,233,166 B2 6/2007 Kanapathippillai et al.
(Continued)

FOREIGN PATENT DOCUMENTS

JP 2001-266596 9/2001

OTHER PUBLICATIONS

Notice of Allowance dated Jul. 8, 2020 in Corresponding U.S. Appl. No. 16/361,783.

*Primary Examiner* — Paulos M Natnael
(74) *Attorney, Agent, or Firm* — F. Chau & Associates, LLC

(57) ABSTRACT

In a method of operating an image sensor, the image sensor includes a pixel array and a plurality of column driving circuits that are connected to a plurality of columns of the pixel array. A test operation is performed by applying a test pattern to the plurality of column driving circuits while changing a level of a well-bias voltage applied to a transistor included in the plurality of column driving circuits. A bias setting operation for setting the level of the well-bias voltage is performed based on a result of the test operation. An image capture operation for detecting incident light and generating a frame image is performed based on the pixel array, the plurality of column driving circuits and the well-bias voltage set by the bias setting operation.

12 Claims, 12 Drawing Sheets

(58) Field of Classification Search
CPC ...... H04N 5/3698; H04N 5/374; H04N 5/369; H04N 5/2253; H03M 1/1071; H03M 1/123
See application file for complete search history.

(56) References Cited

U.S. PATENT DOCUMENTS

| | | |
|---|---|---|
| 7,484,141 B2 | 1/2009 | Shikata |
| 7,486,096 B2 | 2/2009 | Dhong et al. |
| 7,539,880 B2 | 5/2009 | Mentzer et al. |
| 7,610,533 B2 | 10/2009 | Ishimura et al. |
| 8,018,247 B2 | 9/2011 | Priel et al. |
| 8,659,969 B2 | 2/2014 | Fujiwara et al. |
| 9,294,763 B2 | 3/2016 | Solhusvik et al. |
| 9,797,950 B2 | 10/2017 | Nishikawa |
| 9,843,794 B2 * | 12/2017 | Lim ............... H04N 17/002 |
| 10,455,227 B2 * | 10/2019 | Kim ............... H04N 17/002 |
| 10,616,571 B2 * | 4/2020 | Chae ............... H03M 1/1071 |
| 10,979,701 B2 * | 4/2021 | Chae ............... H03M 1/1071 |
| 2005/0024510 A1 | 2/2005 | Lapstun et al. |
| 2006/0259840 A1 | 11/2006 | Abadeer et al. |
| 2008/0158396 A1 | 7/2008 | Fainstain et al. |
| 2016/0295205 A1 * | 10/2016 | Lim ............... H04N 17/002 |
| 2018/0035108 A1 * | 2/2018 | Chae ............... H04N 5/378 |
| 2018/0324416 A1 | 11/2018 | Kim et al. |
| 2020/0077081 A1 | 3/2020 | Lee |
| 2020/0204793 A1 * | 6/2020 | Chae ............... H04N 17/002 |

\* cited by examiner

METHOD OF OPERATING AN IMAGE SENSOR, IMAGE SENSOR PERFORMING THE SAME, AND ELECTRONIC SYSTEM INCLUDING THE SAME

CROSS-REFERENCE TO RELATED APPLICATION

This application is a continuation application of U.S. patent application Ser. No. 16/361,783 filed Mar. 22, 2019, which claims priority under 35 U.S.C. § 119 to Korean Patent Application No. 10-2018-0101575, filed on Aug. 28, 2018 in the Korean Intellectual Property Office (KIPO), the disclosures of which are incorporated by reference herein in their entirety.

TECHNICAL FIELD

Exemplary embodiments of the inventive concept relate generally to image sensors, and more particularly, to methods of operating image sensors, image sensors performing the methods, and electronic system including the image sensors.

DISCUSSION OF RELATED ART

A complementary metal oxide semiconductor (CMOS) image sensor is an image pickup device manufactured using CMOS processes. A CMOS image sensor has lower manufacturing cost, smaller pixel size, and lower power consumption than a charge coupled device (CCD) image sensor having a high-voltage analog circuit. With the improved performance of CMOS image sensors, CMOS image sensors are widely used for mobile electronic devices such as smartphones, tablet personal computers (PCs), digital cameras, automotive devices, etc.

To implement a CMOS image sensor with high speed and high resolution, the CMOS image sensor may have an increased frame rate; however, power consumption may also increase due to the increased frame rate.

SUMMARY

According to an exemplary embodiment of the inventive concept, in a method of operating an image sensor, the image sensor includes a pixel array and a plurality of column driving circuits that are connected to a plurality of columns of the pixel array. A test operation is performed by applying a test pattern to the plurality of column driving circuits while changing a level of a well-bias voltage applied to a transistor included in the plurality of column driving circuits. A bias setting operation for setting the level of the well-bias voltage is performed based on a result of the test operation. An image capture operation for detecting incident light and generating a frame image is performed based on the pixel array, the plurality of column driving circuits and the well-bias voltage set by the bias setting operation.

According to an exemplary embodiment of the inventive concept, an image sensor includes a pixel array, a plurality of column driving circuits, and a timing controller. The pixel array generates a plurality of analog pixel signals in response to incident light. The plurality of column driving circuits are connected to a plurality of columns of the pixel array, include a transistor, and convert the plurality of analog pixel signals into a plurality of digital signals corresponding to a frame image. The timing controller performs a test operation by applying a test pattern to the plurality of column driving circuits while changing a level of a well-bias voltage applied to the transistor, and performs a bias setting operation for setting the level of the well-bias voltage applied to the transistor based on a result of the test operation. An image capture operation for generating the frame image is performed based on the well-bias voltage set by the bias setting operation.

According to an exemplary embodiment of the inventive concept, an electronic system includes an image sensor and a controller. The image sensor generates a frame image in response to incident light. The controller controls an operation of the image sensor. The image sensor includes a pixel array, a plurality of column driving circuits, and a timing controller. The pixel array generates a plurality of analog pixel signals in response to the incident light. The plurality of column driving circuits are connected to a plurality of columns of the pixel array, include a transistor, and convert the plurality of analog pixel signals into a plurality of digital signals corresponding to the frame image. The timing controller performs a test operation by applying a test pattern to the plurality of column driving circuits while changing a level of a well-bias voltage applied to the transistor, and performs a bias setting operation for setting the level of the well-bias voltage applied to the transistor based on a result of the test operation. An image capture operation for generating the frame image is performed based on the well-bias voltage set by the bias setting operation.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
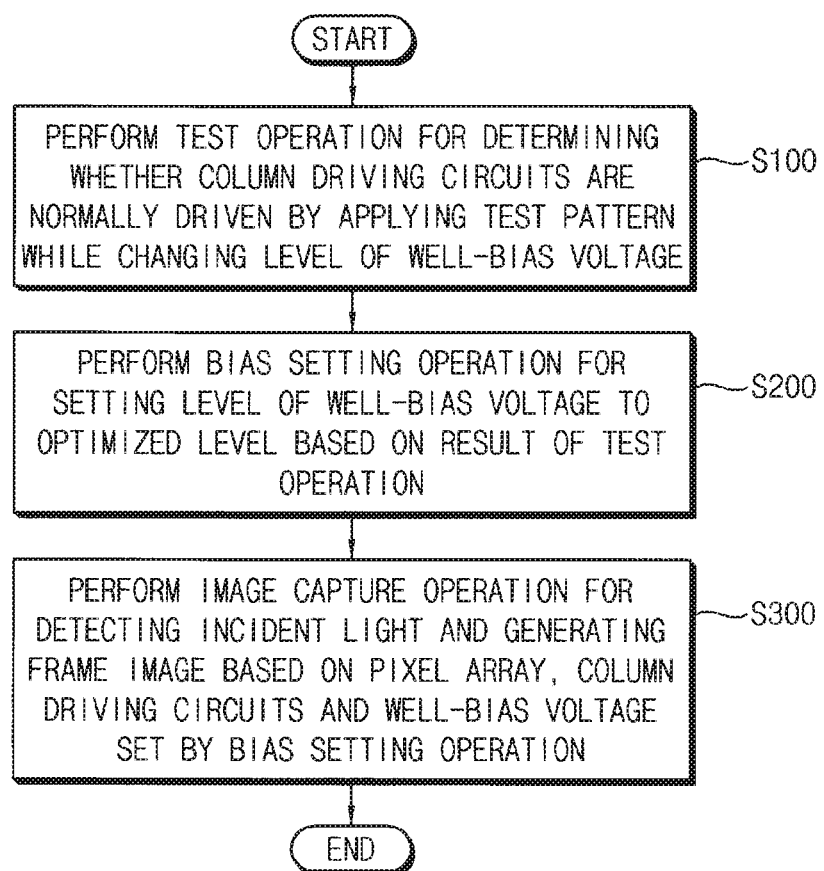
FIG. 1 is a flowchart illustrating a method of operating an image sensor according to an exemplary embodiment of the inventive concept.

Exemplary embodiments of the inventive concept provide a method of operating an image sensor capable of reducing power consumption.

Exemplary embodiments of the inventive concept also provide an image sensor performing the above-described method.

Exemplary embodiments of the inventive concept further provide an electronic system including the above-described image sensor.

Exemplary embodiments of the inventive concept will be described more fully with reference to the accompanying drawings. Like reference numerals may refer to like elements throughout this application.

FIG. 1 is a flowchart illustrating a method of operating an image sensor according to an exemplary embodiment of the inventive concept.

Referring to FIG. 1, a method of operating an image sensor according to an exemplary embodiment of the inventive concept is performed by an image sensor including a pixel array and a plurality of column driving circuits that are connected to a plurality of columns of the pixel array. Hereinafter, the method of operating the image sensor will be described based on a complementary metal-oxide semiconductor (CMOS) image sensor. However, the method of operating the image sensor according to exemplary embodiments of the inventive concept may be applied to drive a charge-coupled device (CCD) image sensor. Detailed configurations of a CMOS image sensor and a unit pixel will be described below with reference to FIGS. 2, 9, 10, and 11.

In the method of operating the image sensor according to an exemplary embodiment of the inventive concept, a test operation for determining whether the plurality of column driving circuits are normally driven or not is performed (operation S100). The test operation is performed by applying a test pattern to the plurality of column driving circuits while changing a level of a well-bias voltage applied to a transistor included in the plurality of column driving circuits. For example, the test operation may be a built-in self test (BIST) operation that is internally performed in the image sensor by itself.

Configurations of the plurality of column driving circuits including the transistor, types of the transistor, and types of the well-bias voltage will be described with reference to FIGS. 2, 3, 4A, and 4B. Detailed examples of the test operation will be described with reference to FIGS. 5 and 6.

A bias setting operation for setting the level of the well-bias voltage to an optimized level is performed based on a result of the test operation (operation S200). For example, the optimized level of the well-bias voltage may be a voltage level for reducing power consumption of the image sensor.

An image capture (or pickup) operation for detecting incident light and generating a frame image is performed based on the pixel array, the plurality of column driving circuits, and the well-bias voltage set by the bias setting operation (operation S300). For example, the incident light may be detected by the pixel array to generate a plurality of analog pixel signals, the plurality of analog pixel signals may be converted into a plurality of digital signals by the plurality of column driving circuits to which the set well-bias voltage is applied, and thus the frame image may be generated. In the method of operating the image sensor according to an exemplary embodiment of the inventive concept, the frame image may be generated based on the well-bias voltage having the optimized level, and thus the image sensor may have relatively low power consumption.

In exemplary embodiments of the inventive concept, the test operation and the bias setting operation may be performed in real-time or during runtime while operating the image sensor. For example, the test operation and the bias setting operation may be performed when the image sensor is powered on. As another example, the test operation and the bias setting operation may be recursively or repeatedly performed for each of a predetermined number of frames or for a predetermined time period while the image sensor normally operates after the image sensor is powered on (e.g., while or immediately before an image capture operation is performed).

Figure 2:
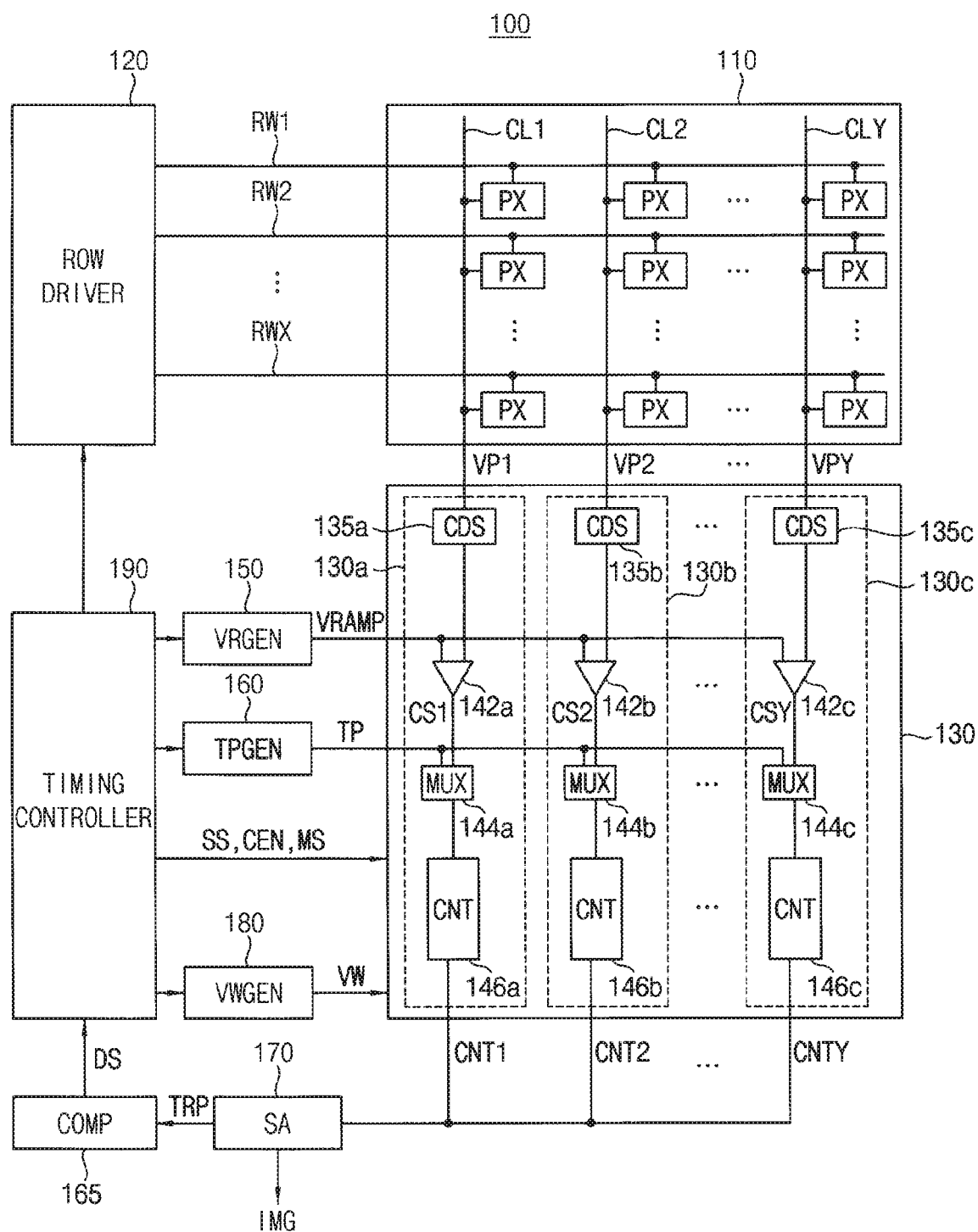
FIG. 2 is a block diagram illustrating an image sensor according to an exemplary embodiment of the inventive concept.

FIG. 2 is a block diagram illustrating an image sensor according to an exemplary embodiment of the inventive concept.

Referring to FIG. 2, an image sensor 100 includes a pixel array 110, a column driver 130 including a plurality of column driving circuits 130a, 130b, . . . , 130c, and a timing controller 190. The image sensor 100 may further include a row driver 120, a ramp signal generator (VRGEN) 150, a test pattern generator (TPGEN) 160, a comparison logic (COMP) 165, a serial adder (SA) 170, and a well-bias voltage generator (VWGEN) 180.

In exemplary embodiments of the inventive concept, the image sensor 100 may be classified as a front side illumination (FSI) image sensor or a back side illumination (BSI) image sensor depending on whether a light receiving surface is the front or back side of a substrate.

The pixel array 110 includes a plurality of unit pixels PX that are arranged in a matrix formation. Each of the plurality of unit pixels PX may be connected to a respective one of a plurality of rows RW1, RW2, . . . , RWX and a respective one of a plurality of columns CL1, CL2, . . . , CLY, where each of X and Y is a natural number greater than or equal to two. The pixel array 110 generates a plurality of analog pixel signals VP1, VP2, . . . , VPY based on incident light. A configuration and an operation of each unit pixel will be described with reference to FIG. 11.

The row driver 120 may be connected to the plurality of rows RW1~RWX of the pixel array 110. The row driver 120 may generate driving signals to drive the plurality of rows RW1~RWX. For example, the row driver 120 may drive the plurality of unit pixels PX included in the pixel array 110 row by row.

The plurality of column driving circuits 130a~130c are connected to the plurality of columns CL1~CLY of the pixel array 110. The plurality of column driving circuits 130a~130c convert the plurality of analog pixel signals VP1~VPY output from the plurality of columns CL1~CLY into a plurality of digital signals CNT1, CNT2, . . . , CNTY.

Each of the plurality of column driving circuits 130a~130c may include a respective one of a plurality of correlated double sampling circuits (CDS) 135a, 135b, . . . , 135c, a respective one of a plurality of comparators 142a, 142b, . . . , 142c, a respective one of a plurality of multiplexers (MUX) 144a, 144b, . . . , 144c, and a respective one of a plurality of counters (CNT) 146a, 146b, . . . , 146c. For example, the first column driving circuit 130a may include the first correlated double sampling circuit 135a, the first comparator 142a, the first multiplexer 144a, and the first counter 146a.

The plurality of correlated double sampling circuits 135a~135c may be respectively connected to the plurality of columns CL1~CLY of the pixel array 110. The plurality of correlated double sampling circuits 135a~135c may perform a correlated double sampling operation on the plurality of analog pixel signals VP1~VPY output from the pixel array 110. For example, the first correlated double sampling circuit 135a may be connected to the first column CL1 and may perform the correlated double sampling operation on the first analog pixel signal VP1 output from the first column CL1. The plurality of correlated double sampling circuits 135a~135c may form a correlated double sampling block.

The plurality of comparators 142a~142c may be connected to the plurality of columns CL1~CLY of the pixel array 110 via the plurality of correlated double sampling circuits 135a~135c. The plurality of comparators 142a~142c may compare the plurality of analog pixel signals VP1~VPY (e.g., a plurality of correlated double sampled analog pixel signals output from the plurality of correlated double sampling circuits 135a~135c) with a ramp signal VRAMP to generate a plurality of comparison signals CS1, CS2, . . . , CSY. For example, the first comparator 142a may compare the first analog pixel signal VP1 with the ramp signal VRAMP to generate the first comparison signal CS1.

The plurality of multiplexers 144a~144c may output the plurality of comparison signals CS1~CSY output from the plurality of comparators 142a~142c or a test pattern TP provided from the test pattern generator 160 based on a selection signal SS. For example, the first multiplexer 144a may output one of the first comparison signal CS1 and the test pattern TP based on the selection signal SS.

The plurality of counters 146a~146c may be connected to the plurality of columns CL1~CLY of the pixel array 110 via the plurality of correlated double sampling circuits 135a~135c and the plurality of comparators 142a~142c. The plurality of counters 146a~146c may generate the plurality of digital signals CNT1~CNTY based on outputs of the plurality of multiplexers 144a~144c. For example, the first counter 146a may generate the first digital signal CNT1 based on the first comparison signal CS1 or the test pattern TP output from the first multiplexer 144a (e.g., may count a level transition time of the first comparison signal CS1 to generate the first digital signal CNT1).

The plurality of comparators 142a~142c and the plurality of counters 146a~146c may form an analog-to-digital conversion (ADC) block. The analog-to-digital conversion block may be connected to the plurality of columns CL1~CLY of the pixel array 110 via the correlated double sampling block. The analog-to-digital conversion block may perform a column analog-to-digital conversion operation that converts the plurality of analog pixel signals VP1~VPY (e.g., the plurality of correlated double sampled analog pixel signals output from the plurality of correlated double sampling circuits 135a~135c) into the plurality of digital signals CNT1~CNTY in parallel (e.g., simultaneously or concurrently).

In exemplary embodiments of the inventive concept, each of the plurality of counters 146a~146c may include a plurality of flip-flops that are cascaded-connected to one another, and each of the plurality of flip-flops may include a plurality of transistors. Each of the plurality of transistors may be driven based on operating voltages such as a power supply voltage, a well-bias voltage VW, etc., and the well-bias voltage VW may be set to have an optimized level, as described with reference to FIG. 1.

In exemplary embodiments of the inventive concept, the analog-to-digital conversion block may operate based on a Gray code to reduce data error. In exemplary embodiments of the inventive concept, the analog-to-digital conversion block may operate based on a phase shift code to represent relatively detailed information based on a relatively low frequency.

The serial adder 170 may add (e.g., combine or merge) the plurality of digital signals CNT1~CNTY together to generate image data IMG or a test result pattern TRP. For example, when the plurality of multiplexers 144a~144c output the plurality of comparison signals CS1~CSY, the serial adder 170 may add the plurality of digital signals CNT1~CNTY together to generate the image data IMG. When the plurality of multiplexers 144a~144c output the test pattern TP, the serial adder 170 may add the plurality of digital signals CNT1~CNTY together to generate the test result pattern TRP.

Operations of the plurality of column driving circuits 130a~130c, e.g., operations of the correlated double sampling block and the analog-to-digital conversion block may be performed on the plurality of unit pixels PX included in the pixel array 110 row by row. For example, the correlated double sampling operation and the analog-to-digital conversion operation may be performed on the analog pixel signals VP1~VPY that are generated from pixels connected to the first row RW1 to generate the plurality of digital signals CNT1~CNTY, and then the plurality of digital signals CNT1~CNTY may be added together to generate the image data IMG for the first row RW1. Similarly, the above-described operations may be sequentially repeated on the analog pixel signals VP1~VPY that are generated from pixels connected to the second row RW2 through the analog pixel signals VP1~VPY that are generated from pixels connected to the X-th row RWX, and then the image data IMG for the second through X-th rows RW2~RWX may be sequentially generated. In other words, the image data IMG output from the plurality of column driving circuits 130a~130c and the serial adder 170 at one time may correspond to row image data generated from a single row of the pixel array 110, and row image data for the first through X-th rows RW1~RWX may be added together to obtain frame image data corresponding to a single frame image.

The ramp signal generator 150 may generate the ramp signal VRAMP. The well-bias voltage generator 180 may generate the well-bias voltage VW. The well-bias voltage generator 180 may change a level of the well-bias voltage VW during a test operation and may perform a bias setting operation for setting the level of the well-bias voltage VW to the optimized level based on a control of the timing controller 190.

The test pattern generator 160 may generate the test pattern TP. The test pattern TP may be selectively applied to the plurality of counters 146a~146c based on a control of the plurality of multiplexers 144a~144c. In exemplary embodiments of the inventive concept, the test pattern TP applied to the plurality of counters 146a~146c may be a digital test pattern.

The comparison logic 165 may perform the test operation based on the test result pattern TRP that is generated by the plurality of column driving circuits 130a~130c and the serial adder 170 when the test pattern TP is applied to the plurality of counters 146a~146c. For example, the comparison logic 165 may compare the test result pattern TRP with the test pattern TP to generate a determination signal DS, and may provide the determination signal DS to the timing controller 190. For example, the determination signal DS may represent a test pass when the test result pattern TRP and the test pattern TP are substantially equal to each other. The determination signal DS may represent a test fail when the test result pattern TRP and the test pattern TP are different from each other.

In exemplary embodiments of the inventive concept, at least a part of the test pattern generator 160 and the comparison logic 165 may be included in the timing controller 190.

The timing controller 190 may control overall operation timings of the image sensor 100. For example, the timing controller 190 may control operations of the row driver 120, the ramp signal generator 150, the test pattern generator 160, the well-bias voltage generator 180, etc., and may generate control signals including the selection signal SS for controlling an operation of the plurality of multiplexers 144a~144c, a count enable signal CEN for controlling an operation of the plurality of counters 146a~146c, a mode signal MS for controlling a test mode, a clock signal, etc.

In addition, the timing controller 190 may control the image sensor 100 such that the method described with reference to FIG. 1 is performed by the image sensor 100. For example, the timing controller 190 may control operations of the test pattern generator 160, the plurality of column driving circuits 130a~130c, the well-bias voltage generator 180, etc. to perform the test operation and the bias setting operation. The timing controller 190 may control operations of the row driver 120, the plurality of column driving circuits 130a~130c, the ramp signal generator 150, etc. to perform an image capture operation.

Hereinafter, an operation of the image sensor 100 for performing the method according to an exemplary embodiment of the inventive concept will be described in detail.

When performing the test operation, the test pattern generator 160 may generate the test pattern TP, the plurality of multiplexers 144a~144c may output the test pattern TP based on the selection signal SS, the plurality of counters 146a~146c may generate the plurality of digital signals CNT1~CNTY based on the test pattern TP, the serial adder 170 may generate the test result pattern TRP based on the plurality of digital signals CNT1~CNTY, and the comparison logic 165 may generate the determination signal DS based on the test result pattern TRP. The test operation may be performed while changing the level of the well-bias voltage VW by the well-bias voltage generator 180. All of such operations may be controlled by the timing controller 190.

When performing the bias setting operation, the timing controller 190 and the well-bias voltage generator 180 may set the level of the well-bias voltage VW to the optimized level based on the determination signal DS. For example, the optimized level may be determined based on tested passed voltage levels.

When performing the image capture operation, the pixel array 110 may generate the plurality of analog pixel signals VP1~VPY based on the incident light, the plurality of correlated double sampling circuits 135a~135c may perform the correlated double sampling operation on the plurality of analog pixel signals VP1~VPY, the ramp signal generator 150 may generate the ramp signal VRAMP, the plurality of comparators 142a~142c may compare the plurality of analog pixel signals VP1~VPY with the ramp signal VRAMP to generate the plurality of comparison signals CS1~CSY, the plurality of multiplexers 144a~144c may output the plurality of comparison signals CS1~CSY based on the selection signal SS, the plurality of counters 146a~146c may generate the plurality of digital signals CNT1~CNTY based on the plurality of comparison signals CS1~CSY, and the serial adder 170 may generate the image data IMG based on the plurality of digital signals CNT1~CNTY. Such operations may be sequentially performed for all of the plurality of rows RW1~RWX of the pixel array 110 to obtain the frame image. All of such operations may be controlled by the timing controller 190.

In exemplary embodiments of the inventive concept, when performing the test operation and the bias setting operation, the ramp signal generator 150, the plurality of correlated double sampling circuits 135a~135c, and the plurality of comparators 142a~142c may be disabled. Similarly, when performing the image capture operation, the test pattern generator 160 and the comparison logic 165 may be disabled.

In exemplary embodiments of the inventive concept, the test pattern TP may be applied to all of the plurality of column driving circuits 130a~130c. In other words, the test operation may be performed on all of the plurality of column driving circuits 130a~130c. Such an operation mode for performing the test operation on all of the plurality of column driving circuits 130a~130c may be referred to as a first test mode.

In exemplary embodiments of the inventive concept, the test pattern TP may be applied to only some or a part of the plurality of column driving circuits 130a~130c. In other words, the test operation may be performed on some or a part of the plurality of column driving circuits 130a~130c. For example, since a characteristic of column driving circuits located in the middle of the column driver 130 may be relatively vulnerable or weak, the test operation may be performed on only a (Y/2)-th column driving circuit that is a central column driving circuit and adjacent or neighboring column driving circuits. Such an operation mode for performing the test operation on some or a part of the plurality of column driving circuits 130a~130c may be referred to as a second test mode.

In exemplary embodiments of the inventive concept, the test mode may be changed based on the mode signal MS. For example, when the mode signal MS has a first logic level (e.g., a logic low level), the test operation may be performed based on the first test mode. When the mode signal MS has a second logic level (e.g., a logic high level), the test operation may be performed based on the second test mode.

Figure 3:
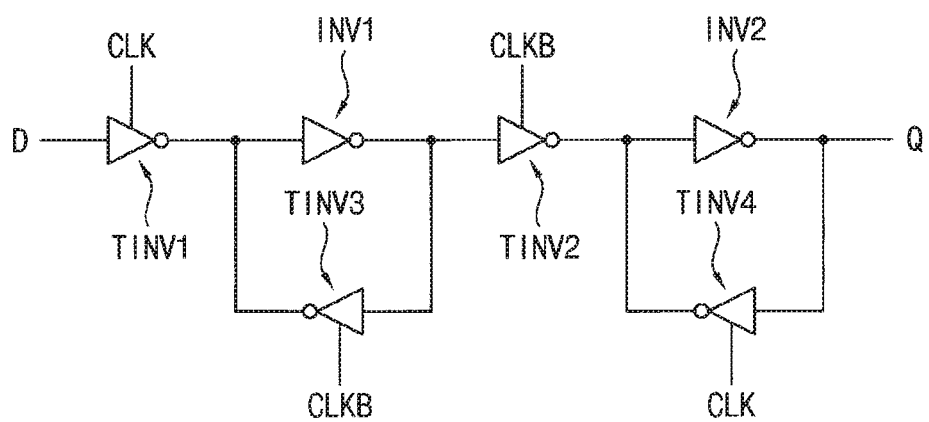
FIG. 3 is a block diagram illustrating a flip-flop that is included in a column driving circuit of an image sensor according to an exemplary embodiment of the inventive concept.
Figure 4A:
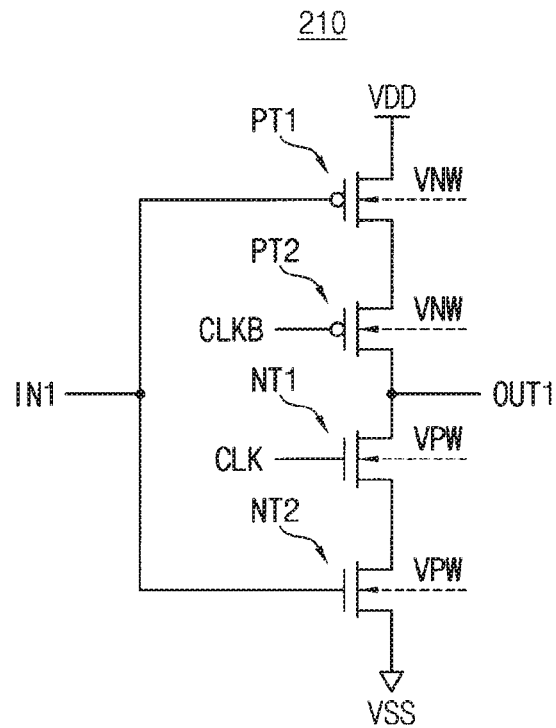
FIGS. 4A and 4B are circuit diagrams illustrating a tri-state inverter and an inverter that are included in the flip-flop of FIG. 3 according to exemplary embodiments of the inventive concept.
Figure 4B:
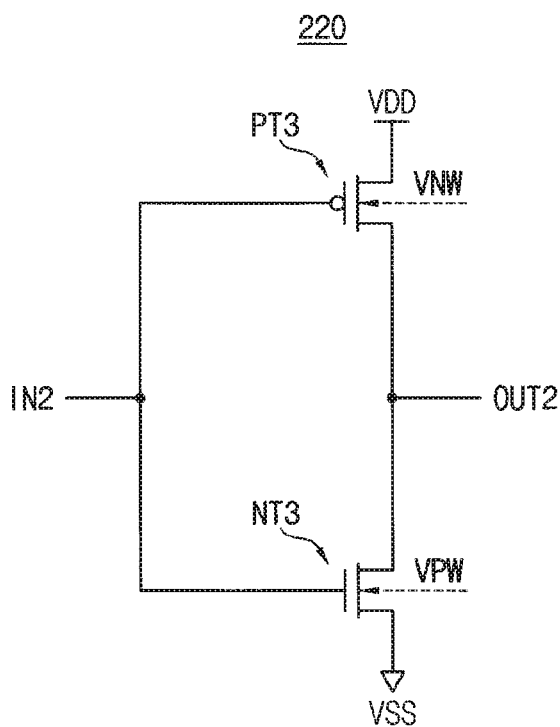

FIG. 3 is a block diagram illustrating a flip-flop that is included in a column driving circuit of an image sensor according to an exemplary embodiment of the inventive concept. FIGS. 4A and 4B are circuit diagrams illustrating a tri-state inverter and an inverter that are included in the flip-flop of FIG. 3 according to exemplary embodiments of the inventive concept.

Referring to FIG. 3, a flip-flop 200 may include an input terminal D, an output terminal Q, a plurality of tri-state inverters TINV1, TINV2, TINV3, and TINV4, and a plurality of inverters INV1 and INV2.

The tri-state inverter TINV1, the inverter INV1, the tri-state inverter TINV2, and the inverter INV2 may be connected in series between the input terminal D and the output terminal Q. Inputs and outputs of the tri-state inverter TINV3 and the inverter INV1 may be cross-coupled, and inputs and outputs of the tri-state inverter TINV4 and the inverter INV2 may be cross-coupled. For example, the input of the tri-state inverter TINV3 and the output of the inverter INV1 may be connected to each other, and the output of the tri-state inverter TINV3 and the input of the inverter INV1 may be connected to each other. The tri-state inverters TINV1 and TINV4 may be controlled in response to a clock signal CLK, and the tri-state inverters TINV2 and TINV3 may be controlled in response to an inverted clock signal CLKB.

The flip-flop 200 of FIG. 3 may be included in each of the plurality of column driving circuits 130a~130c in FIG. 2. Particularly, the flip-flop 200 of FIG. 3 may be included in each of the plurality of counters 146a~146c in FIG. 2.

Referring to FIG. 4A, a tri-state inverter 210 may include an input terminal IN1, an output terminal OUT1, a plurality of p-type metal oxide semiconductor (PMOS) transistors PT1 and PT2, and a plurality of n-type metal oxide semiconductor (NMOS) transistors NT1 and NT2.

The PMOS transistors PT1 and PT2 and the NMOS transistors NT1 and NT2 may be connected in series between a power supply voltage VDD and a ground voltage VSS. For example, the PMOS transistors PT1 and PT2 may be connected in series between the power supply voltage VDD and the output terminal OUT1, and the NMOS transistors NT1 and NT2 may be connected in series between the output terminal OUT1 and the ground voltage VSS. The PMOS transistor PT1 may have a gate electrode connected to the input terminal IN1, the PMOS transistor PT2 may have a gate electrode receiving the inverted clock signal CLKB, the NMOS transistor NT1 may have a gate electrode receiving the clock signal CLK, and the NMOS transistor NT2 may have a gate electrode connected to the input terminal IN1.

Referring to FIG. 4B, an inverter 220 may include an input terminal IN2, an output terminal OUT2, a PMOS transistor PT3, and an NMOS transistor NT3.

The PMOS transistor PT3 and the NMOS transistor NT3 may be connected in series between the power supply voltage VDD and the ground voltage VSS. For example, the PMOS transistor PT3 may be connected between the power supply voltage VDD and the output terminal OUT2, and the NMOS transistor NT3 may be connected between the output terminal OUT2 and the ground voltage VSS. Each of the PMOS transistor PT3 and the NMOS transistor NT3 may have a gate electrode connected to the input terminal IN2.

As illustrated in FIGS. 4A and 4B, each of the tri-state inverter 210 and the inverter 220 may include at least one PMOS transistor and at least one NMOS transistor. In addition, a first well-bias voltage VNW may be applied to each of the PMOS transistors PT1, PT2, and PT3, and a second well-bias voltage VPW may be applied to each of the NMOS transistors NT1, NT2, and NT3. In other words, the well-bias voltage VW in FIG. 2 may include the first well-bias voltage VNW and the second well-bias voltage VPW.

Typically, a PMOS transistor may include an n-type well or n-well to form a p-type channel or p-channel, and thus the first well-bias voltage VNW may be referred to as an n-well bias voltage applied to the n-well (or an n-substrate) in the PMOS transistor. Similarly, an NMOS transistor may include a p-type well or p-well to form an n-type channel or n-channel, and thus the second well-bias voltage VPW may be referred to as a p-well bias voltage applied to the p-well (or a p-substrate) in the NMOS transistor.

In exemplary embodiments of the inventive concept, an initial setting level of the first well-bias voltage VNW may be substantially the same as a level of the power supply voltage VDD (e.g., about 1V), and an initial setting level of the second well-bias voltage VPW may be substantially the same as a level of the ground voltage VSS (e.g., about 0V).

In the method of operating the image sensor according to an exemplary embodiment of the inventive concept, a threshold voltage of each transistor may be controlled or adjusted using a body effect or an adaptive body bias generation (ABBG) scheme, and thus power consumption by the plurality of column driving circuits 130a~130c in the image sensor 100 may be reduced. For example, at least one of a level of the first well-bias voltage VNW and a level of the second well-bias voltage VPW may be changed or adjusted, and the level of the well-bias voltage VW may be changed or adjusted such that the threshold voltage of each transistor increases.

Figure 5:
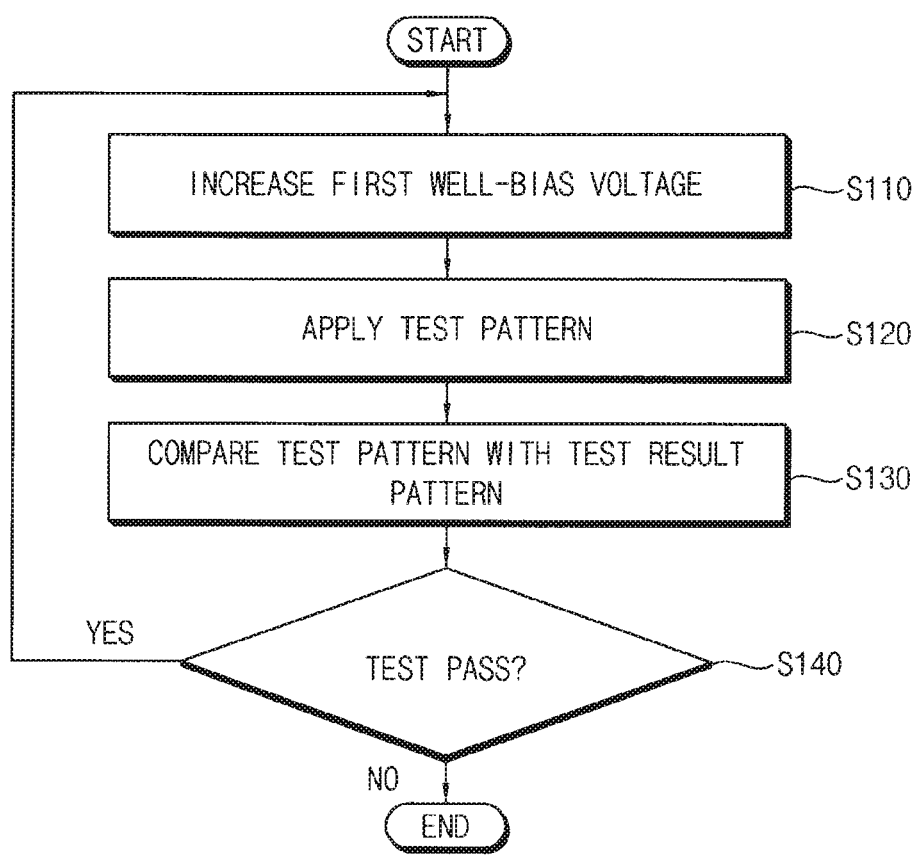
FIGS. 5 and 6 are flowcharts illustrating performing a test operation in the method of FIG. 1 according to exemplary embodiments of the inventive concept.
Figure 6:
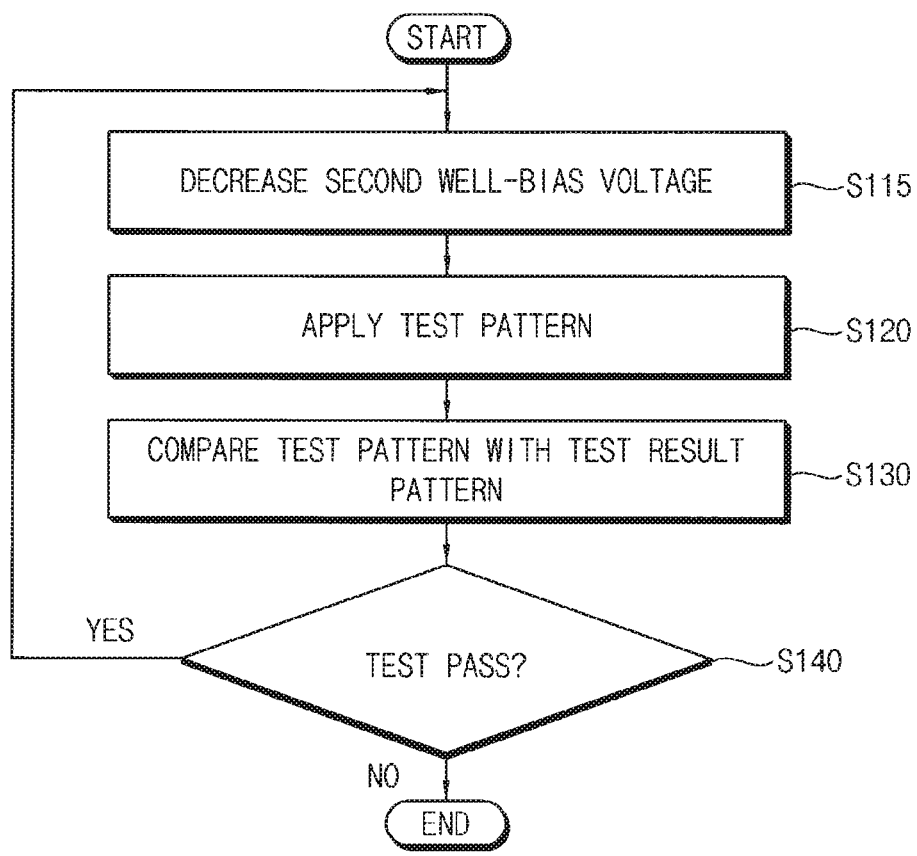

FIGS. 5 and 6 are flowcharts illustrating performing a test operation in the method of FIG. 1 according to exemplary embodiments of the inventive concept.

Referring to FIGS. 1, 2, 4A, 4B, and 5, when performing the test operation, the test operation may be performed while changing the level of the first well-bias voltage VNW. For example, the test operation may be performed while increasing the level of the first well-bias voltage VNW, and a threshold voltage of the PMOS transistor (e.g., each of the PMOS transistors PT1, PT2, and PT3 in FIGS. 4A and 4B) may increase when the level of the first well-bias voltage VNW increases.

First, the level of the first well-bias voltage VNW may increase (operation S110). For example, the level of the first well-bias voltage VNW may increase from the initial setting level (e.g., VNWINIT) by a first increment (e.g., ΔVNW1). In other words, VNW=VNWINIT+ΔVNW1. The first well-bias voltage VNW increased by the first increment may be applied to the plurality of column driving circuits 130a~130c, and the plurality of column driving circuits 130a~130c may be driven based on the increased first well-bias voltage VNW.

After that, the test pattern TP may be applied to the plurality of column driving circuits 130a~130c (operation S120). The plurality of column driving circuits 130a~130c may generate the plurality of digital signals CNT1~CNTY based on the increased first well-bias voltage VNW and the test pattern TP, and the serial adder 170 may generate the test result pattern TRP based on the plurality of digital signals CNT1~CNTY.

The test pattern TP may be compared with the test result pattern TRP (operation S130). In a case of a test pass based on a result of the test operation (operation S140: YES), operations S110, S120, S130, and S140 may be repeated. For example, the level of the first well-bias voltage VNW may increase from the initial setting level by a second increment (e.g., ΔVNW2) that is greater than the first increment (e.g., VNW=VNWINIT+ΔVNW2), and operations S120, S130, and S140 may be performed based on the first well-bias voltage VNW increased by the second increment. In a case of a test fail based on the result of the test operation (operation S140: NO), the test operation may be terminated or finished.

The bias setting operation may be performed after the test operation is completed. For example, the level of the first well-bias voltage VNW may be set to a first optimized level based on tested passed voltage levels.

In exemplary embodiments of the inventive concept, the largest value among the tested passed voltage levels may be set to the first optimized level. For example, if the test operation is passed for about 1.2V, 1.4V, 1.6V, 1.8V, and 2.0V and is failed for about 2.2V based on the result of the test operation, the first optimized level may be set to about 2.0V.

In exemplary embodiments of the inventive concept, the first optimized level may be set based on the largest value among the tested passed voltage levels and a predetermined margin value. For example, if the predetermined margin value is about 0.1V, the first optimized level may be set to about 1.9V by subtracting the predetermined margin value (e.g., about 0.1V) from the largest value (e.g., about 2.0V) among the tested passed voltage levels. In this case, the predetermined margin value may help reduce the possibility of malfunction.

Referring to FIGS. 1, 2, 4A, 4B, and 6, when performing the test operation, the test operation may be performed while changing the level of the second well-bias voltage VPW.

For example, the test operation may be performed while decreasing the level of the second well-bias voltage VPW, and a threshold voltage of the NMOS transistor (e.g., each of the NMOS transistors NT1, NT2, and NT3 in FIGS. 4A and 4B) may increase when the level of the second well-bias voltage VPW decreases.

First, the level of the second well-bias voltage VPW may decrease (operation S115). For example, the level of the second well-bias voltage VPW may decrease from an initial setting level (e.g., VPWINIT) by a first decrement (e.g., $\Delta$VPW1). In other words, VPW=VPWINIT-$\Delta$VPW1. The second well-bias voltage VPW decreased by the first decrement may be applied to the plurality of column driving circuits 130a~130c, and the plurality of column driving circuits 130a~130c may be driven based on the decreased second well-bias voltage VPW.

After that, the test pattern TP may be applied to the plurality of column driving circuits 130a~130c (operation S120), the test pattern TP may be compared with the test result pattern TRP that is generated by the plurality of column driving circuits 130a~130c and the serial adder 170 (operation S130), and follow-up actions may be performed based on a comparison result. Operations S120, S130, and S140 in FIG. 6 may be substantially the same as operations S120, S130, and S140 in FIG. 5, respectively.

For example, in a case of a test pass based on a result of the test operation (operation S140: YES), the level of the second well-bias voltage VPW may decrease from the initial setting level by a second decrement (e.g., $\Delta$VPW2) that is greater than the first decrement (e.g., VPW=VPWINIT-$\Delta$VPW2), and operations S120, S130, and S140 may be performed based on the second well-bias voltage VPW decreased by the second decrement. In a case of a test fail based on the result of the test operation (operation S140: NO), the test operation may be terminated or finished.

The bias setting operation may be performed after the test operation is completed. For example, the level of the second well-bias voltage VPW may be set to a second optimized level based on tested passed voltage levels.

In exemplary embodiments of the inventive concept, the smallest value among the tested passed voltage levels may be set to the second optimized level. For example, if the test operation is passed for about -0.2V, -0.4V, -0.6V, -0.8V, and -1.0V and is failed for about -1.2V based on the result of the test operation, the second optimized level may be set to about -1.0V. In exemplary embodiments of the inventive concept, the second optimized level may be set based on the smallest value among the tested passed voltage levels and a predetermined margin value.

The test operation may be performed while changing both the level of the first well-bias voltage VNW and the level of the second well-bias voltage VPW.

In exemplary embodiments of the inventive concept, operation S110 in FIG. 5 and operation S115 in FIG. 6 may be performed by the well-bias voltage generator 180, operation S120 in FIGS. 5 and 6 may be performed by the test pattern generator 160, operations S130 and S140 in FIGS. 5 and 6 may be performed by the comparison logic 165, and all of these operations may be controlled by the timing controller 190.

As described with reference to FIGS. 5 and 6, at least one of the level of the first well-bias voltage VNW and the level of the second well-bias voltage VPW may be controlled such that at least one of the threshold voltage of the PMOS transistor and the threshold voltage of the NMOS transistor increases, and the plurality of column driving circuits 130a~130c in the image sensor 100 may be driven based on the controlled first well-bias voltage VNW and/or second well-bias voltage VPW, thus reducing power consumption by the plurality of column driving circuits 130a~130c.

Although FIGS. 5 and 6 illustrate examples where the test operation is performed until the test fail occurs, the inventive concept is not limited thereto. For example, the test operation may be performed for a fixed number of times of changing the level of the well-bias voltage. For example, the test operation may be performed by controlling the level of the first well-bias voltage VNW, the number of times of changing the level of the first well-bias voltage VNW may be fixed to four, a first test operation may be passed for about 1.5V, a second test operation may be passed for about 2.0V, and a third test operation may be failed for about 2.5V. In this case, the level of the first well-bias voltage VNW may be changed to a level (e.g., about 2.25V) between the largest tested passed value (e.g., about 2.0V) and the tested failed value (e.g., 2.5V), and a fourth test operation may be performed.

Figure 7:
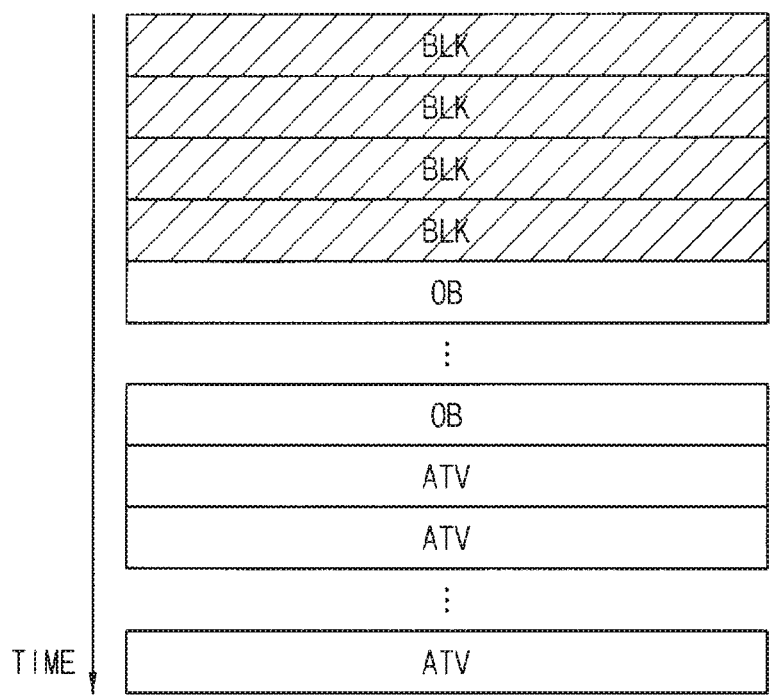
FIGS. 7 and 8 are diagrams for describing a test operation performed in the method of FIG. 1 according to exemplary embodiments of the inventive concept.
Figure 8:
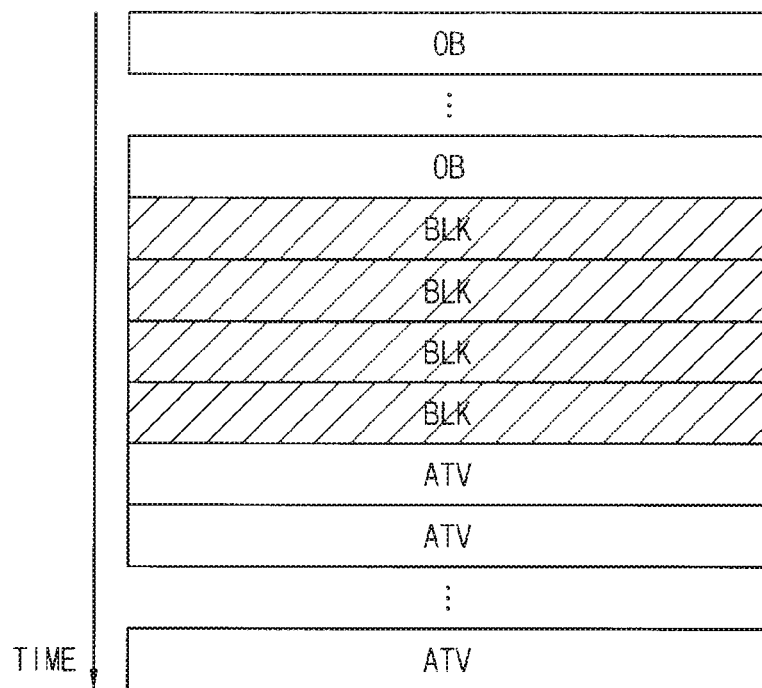

FIGS. 7 and 8 are diagrams for describing a test operation performed in the method of FIG. 1 according to exemplary embodiments of the inventive concept.

Referring to FIGS. 1, 2, 7, and 8, a frame period for outputting a single frame image may include a blank period BLK for performing the test operation and the bias setting operation, an optical black period OB for performing a frame setting operation, and an active period ATV for outputting the image data IMG. In the examples of FIGS. 7 and 8, one rectangle may represent a time interval required to drive one row of the pixel array 110 and may be referred to as one horizontal period or 1H period.

In exemplary embodiments of the inventive concept, the test operation and the bias setting operation may be recursively or repeatedly performed for each of a predetermined number of frames.

In exemplary embodiments of the inventive concept, the test operation and the bias setting operation may be repeated for each frame. For example, during each frame period, the test operation and the bias setting operation may be performed before the image data IMG representing the frame image is output. In other words, the blank period BLK may be arranged before the active period ATV during each frame period.

For example, as illustrated in FIG. 7, the blank period BLK may be arranged before the optical black period OB and the active period ATV. In this example, the blank period BLK may be included in a vertical blank period that is arranged between two consecutive frame periods. As another example, as illustrated in FIG. 8, the blank period BLK may be arranged between the optical black period OB and the active period ATV. For example, the test operation and the bias setting operation may be performed for the blank period BLK during several horizontal periods (e.g., 4H in FIGS. 7 and 8).

In exemplary embodiments of the inventive concept, the test operation and the bias setting operation may be repeated for each of N frames where N is a natural number greater than or equal to two. In this example, each of first, (N+1)-th, (2N+1)-th, ... frame periods may be implemented with the example of FIG. 7 or the example of FIG. 8, and the rest or remainder of frame periods may be implemented without the blank period BLK.

In exemplary embodiments of the inventive concept, the test operation and the bias setting operation may be recursively or repeatedly performed for a predetermined time period. In this example, a first frame period and each frame period immediately after the predetermined time period is elapsed may be implemented with the example of FIG. 7 or the example of FIG. 8, and the rest or remainder of frame periods may be implemented without the blank period BLK.

The optical black period OB may represent a time interval during which the frame setting operation is performed using the analog pixel signals VP output from optical black pixels disposed in an optical black region of the pixel array 110, and the active period ATV may represent a time interval during which the image data IMG is output using the analog pixel signals VP output from active pixels disposed in an active region of the pixel array 110. Typically, the optical black region may be a peripheral region of the pixel array 110 surrounding the active region, e.g., the unit pixels PX connected to the uppermost row (e.g., the first row RW1) of the pixel array 110 may be the optical black pixels. Thus, the optical black period OB should always be arranged before the active period ATV. The blank period BLK may represent a time interval during which the test operation and the bias setting operation are performed using the test pattern TP (not using the unit pixels PX).

Figure 9:
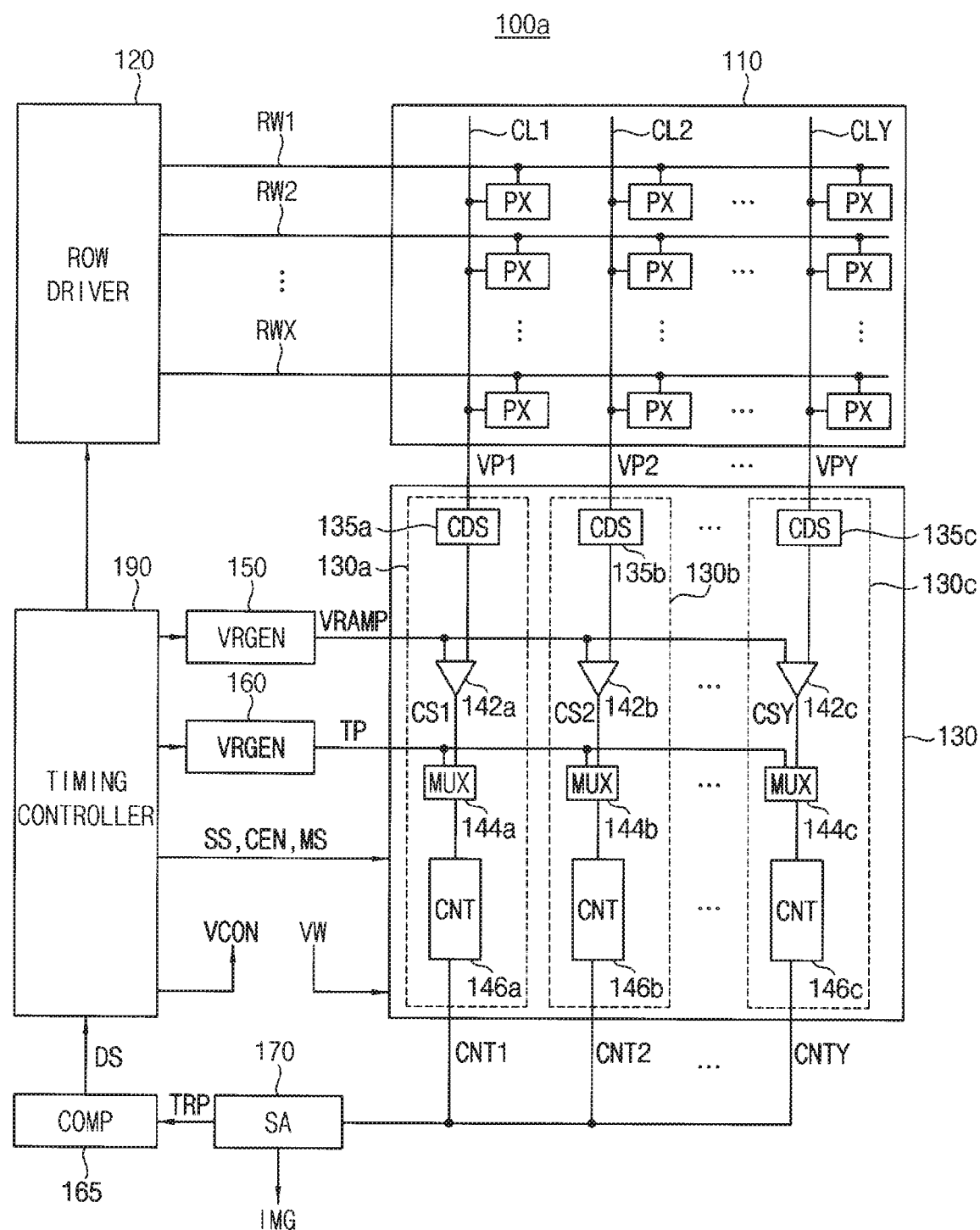
FIGS. 9 and 10 are block diagrams illustrating an image sensor according to exemplary embodiments of the inventive concept.
Figure 10:
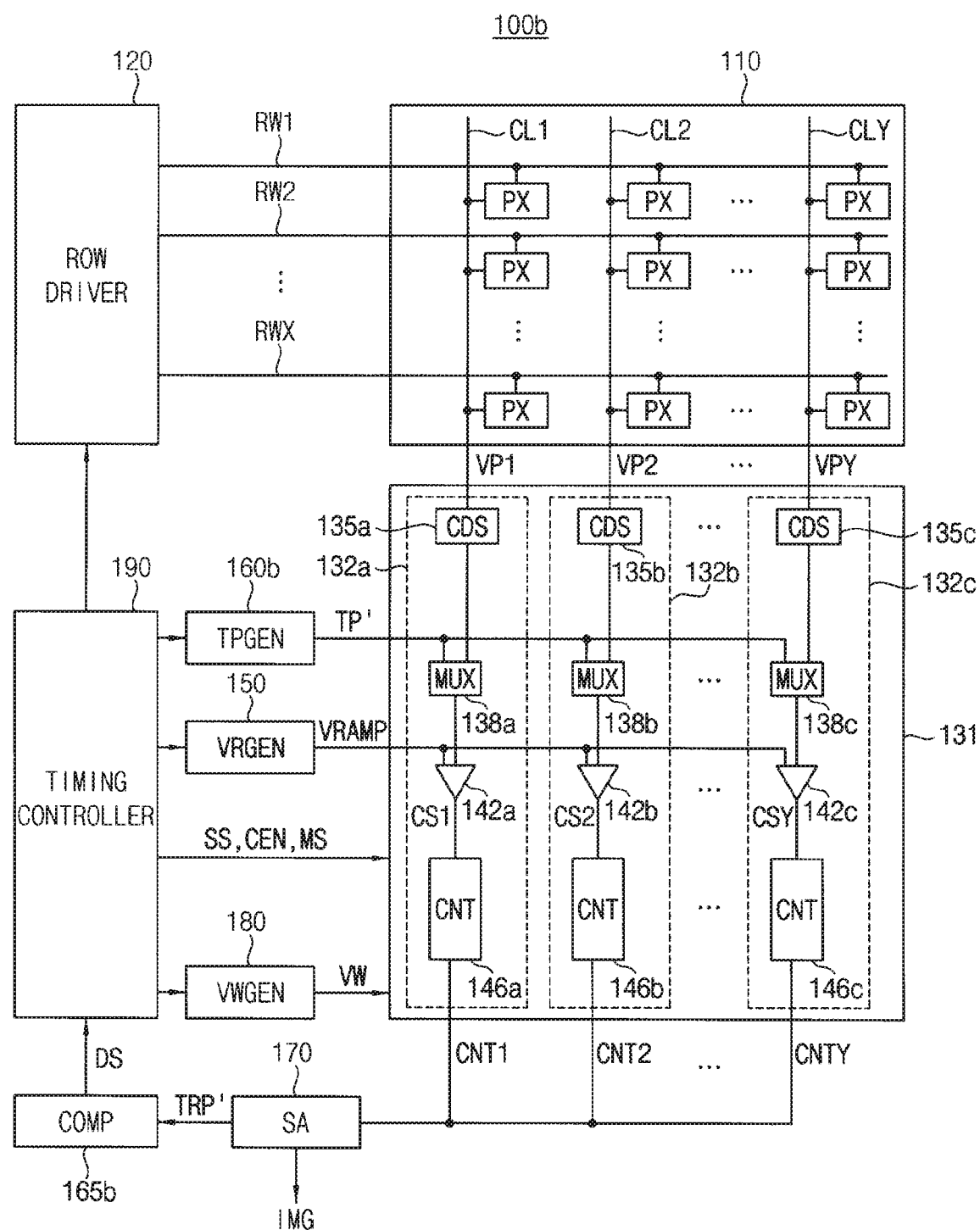

FIGS. 9 and 10 are block diagrams illustrating an image sensor according to exemplary embodiments of the inventive concept.

Referring to FIG. 9, an image sensor 100a includes the pixel array 110, the column driver 130 including the plurality of column driving circuits 130a~130c, and the timing controller 190.

The image sensor 100a may further include the row driver 120, the ramp signal generator 150, the test pattern generator 160, the comparison logic 165, and the serial adder 170.

The image sensor 100a of FIG. 9 may be substantially the same as the image sensor 100 of FIG. 2, except that the well-bias voltage generator 180 is omitted in the image sensor 100a. Repeat descriptions may be omitted.

The well-bias voltage VW supplied to the plurality of column driving circuits 130a~130c may be provided from an external well-bias voltage generator. The timing controller 190 may further generate a control signal VCON for controlling the external well-bias voltage generator.

Referring to FIG. 10, an image sensor 100b includes the pixel array 110, a column driver 131 including a plurality of column driving circuits 132a, 132b, . . . , 132c, and the timing controller 190. The image sensor 100b may further include the row driver 120, the ramp signal generator 150, a test pattern generator 160b, a comparison logic 165b, the serial adder 170, and the well-bias voltage generator 180.

The image sensor 100b of FIG. 10 may be substantially the same as the image sensor 100 of FIG. 2, except that the test pattern generator 160b and the comparison logic 165b are changed and the plurality of column driving circuits 132a~132c included in the column driver 131 are changed. Repeat descriptions may be omitted.

Each of the plurality of column driving circuits 132a~132c may include a respective one of a plurality of correlated double sampling circuits 135a~135c, a respective one of a plurality of multiplexers 138a, 138b, . . . , 138c, a respective one of a plurality of comparators 142a~142c, and a respective one of a plurality of counters 146a~146c.

The plurality of multiplexers 138a~138c may output the plurality of correlated double sampled analog pixel signals output from the plurality of correlated double sampling circuits 135a~135c or a test pattern TV provided from the test pattern generator 160b based on the selection signal SS. The plurality of comparators 142a~142c may compare outputs of the plurality of multiplexers 138a~138c with the ramp signal VRAMP to generate the plurality of comparison signals CS1~CSY. The plurality of counters 146a~146c may generate the plurality of digital signals CNT1~CNTY based on the plurality of comparison signals CS1~CSY.

The serial adder 170 may add (e.g., combine or merge) the plurality of digital signals CNT1~CNTY together to generate the image data IMG or a test result pattern TRP'.

The test pattern generator 160b may generate the test pattern TV. The test pattern TV may be selectively applied to the plurality of comparators 142a~142c based on a control of the plurality of multiplexers 138a~138c. In exemplary embodiments of the inventive concept, the test pattern TV applied to the plurality of comparators 142a~142c may be an analog test pattern.

The comparison logic 165b may perform the test operation based on the test result pattern TRV that is generated by the plurality of column driving circuits 132a~132c and the serial adder 170 when the test pattern TP' is applied to the plurality of comparators 142a~142c.

Hereinafter, an operation of the image sensor 100b for performing the method according to an exemplary embodiment of the inventive concept will be described in detail.

When performing the test operation, the test pattern generator 160b may generate the test pattern TP', the plurality of multiplexers 138a~138c may output the test pattern TV based on the selection signal SS, the plurality of comparators 142a~142c may generate the plurality of comparison signals CS1~CSY based on the test pattern TV, the plurality of counters 146a~146c may generate the plurality of digital signals CNT1~CNTY based on the plurality of comparison signals CS1~CSY, the serial adder 170 may generate the test result pattern TRP' based on the plurality of digital signals CNT1~CNTY, and the comparison logic 165b may generate the determination signal DS based on the test result pattern TRP'. The test operation may be performed while changing the level of the well-bias voltage VW by the well-bias voltage generator 180. All of such operations may be controlled by the timing controller 190.

When performing the bias setting operation, the timing controller 190 and the well-bias voltage generator 180 may set the level of the well-bias voltage VW to the optimized level based on the determination signal DS. For example, the optimized level may be determined based on tested passed voltage levels.

When performing the image capture operation, the pixel array 110 may generate the plurality of analog pixel signals VP1~VPY based on the incident light, the plurality of correlated double sampling circuits 135a~135c may perform the correlated double sampling operation on the plurality of analog pixel signals VP1~VPY, the ramp signal generator 150 may generate the ramp signal VRAMP, the plurality of multiplexers 138a~138c may output the plurality of analog pixel signals VP1~VPY based on the selection signal SS, the plurality of comparators 142a~142c may compare the plurality of analog pixel signals VP1~VPY with the ramp signal VRAMP to generate the plurality of comparison signals CS1~CSY, the plurality of counters 146a~146c may generate the plurality of digital signals CNT1~CNTY based on the plurality of comparison signals CS1~CSY, and the serial adder 170 may generate the image data IMG based on the plurality of digital signals CNT1~CNTY. Such operations may be sequentially performed for all of the plurality of rows RW1~RWX of the pixel array 110 to obtain the frame image. All of such operations may be controlled by the timing controller 190.

According to an exemplary embodiment of the inventive concept, the well-bias voltage generator 180 may be omitted in the image sensor 100b, as described with reference to FIG. 9.

In the image sensor and the method of operating the image sensor according to an exemplary embodiment of the inventive concept, the test operation and the bias setting operation may be performed in real-time or during runtime while operating the image sensor, and thus the level of the well-bias voltage VW may be efficiently set to the optimized level. The image sensor may be driven based on the well-bias voltage VW having the optimized level, and thus the image sensor may have relatively low power consumption.

Although exemplary embodiments of the inventive concept are described based on examples where the level of the well-bias voltage VW applied to the transistor included in the plurality of column driving circuits is adjusted, the inventive concept is not limited thereto. For example, the inventive concept may be employed in various examples where at least one of various operating voltages (e.g., at least a part of power supply voltages, a high level of a clock signal, etc.) applied to the plurality of column driving circuits is adjusted.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

Figure 11:
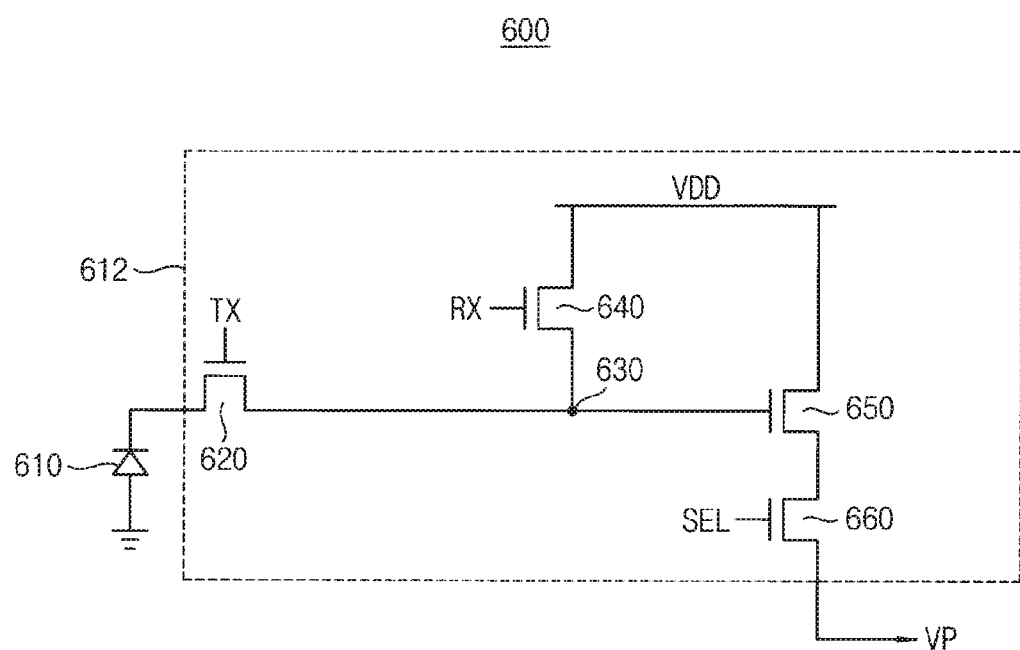
FIG. 11 is a circuit diagram illustrating a unit pixel that is included in an image sensor according to an exemplary embodiment of the inventive concept.

FIG. 11 is a circuit diagram illustrating a unit pixel that is included in an image sensor according to an exemplary embodiment of the inventive concept.

Referring to FIG. 11, a unit pixel 600 may include a photoelectric conversion unit 610 and a signal generation unit 612.

The photoelectric conversion unit 610 may perform a photoelectric conversion operation. For example, the photoelectric conversion unit 610 may convert the incident light into photo-charges during an integration mode. If an image sensor including the unit pixel 600 is a CMOS image sensor, image information on an object to be captured may be obtained by collecting charge carriers (e.g., electron-hole pairs) in the photoelectric conversion unit 610 proportional to an intensity of the incident light through an open shutter of the CMOS image sensor during the integration mode.

The signal generation unit 612 may generate an electric signal (e.g., the analog pixel signal VP) based on the photo-charges generated by the photoelectric conversion operation during a readout mode. If the image sensor including the unit pixel 600 is the CMOS image sensor, the shutter may be closed, and the analog pixel signal VP may be generated based on the image information in a form of the charge carriers during the readout mode after the integration mode. For example, as illustrated in FIG. 11, the unit pixel 600 may have a four-transistor structure including four transistors.

For example, the signal generation unit 612 may include a transfer transistor 620, a reset transistor 640, a drive transistor 650, a selection transistor 660, and a floating diffusion node 630. The transfer transistor 620 may be connected between the photoelectric conversion unit 610 and the floating diffusion node 630, and may include a gate electrode receiving a transfer signal TX. The reset transistor 640 may be connected between the power supply voltage VDD and the floating diffusion node 630, and may include a gate electrode receiving a reset signal RX. The drive transistor 650 may be connected between the power supply voltage VDD and the selection transistor 660, and may include a gate electrode connected to the floating diffusion node 630. The selection transistor 660 may be connected between the drive transistor 650 and an output terminal outputting the analog pixel signal VP, and may include a gate electrode receiving a selection signal SEL.

Hereinafter, an operation of generating the analog pixel signal VP will be described in detail. When an external light is incident onto the photoelectric conversion unit 610 during the integration mode, the photo charges are collected or generated in proportion to the amount of the incident light. During the readout mode after the integration mode, the selection signal SEL is activated, and the signal generation unit 612 is selected in response to the selection signal SEL. After that, the reset signal RX is activated, the reset transistor 640 is turned on in response to the reset signal RX, and an electric potential of the floating diffusion node 630, which is a sensing node, is reset to the power supply voltage VDD. When the reset signal RX is deactivated and the reset operation is completed, the analog pixel signal VP has a reset level corresponding to a reset state of the floating diffusion node 630. After that, the transfer signal TX is activated, the transfer transistor 620 is turned on in response to the transfer signal TX, and the photo charges accumulated in the photoelectric conversion unit 610 are transferred to the floating diffusion node 630 via the transfer transistor 620. When the transfer signal TX is deactivated and the charge transfer operation is completed, the analog pixel signal VP has an image level corresponding to the incident light (e.g., corresponding to the photo charges accumulated in the photoelectric conversion unit 610).

A configuration of the signal generation unit 612 may be changed according to exemplary embodiments of the inventive concept. In addition, one signal generation unit may be shared by a plurality of photoelectric conversion units.

Figure 12:
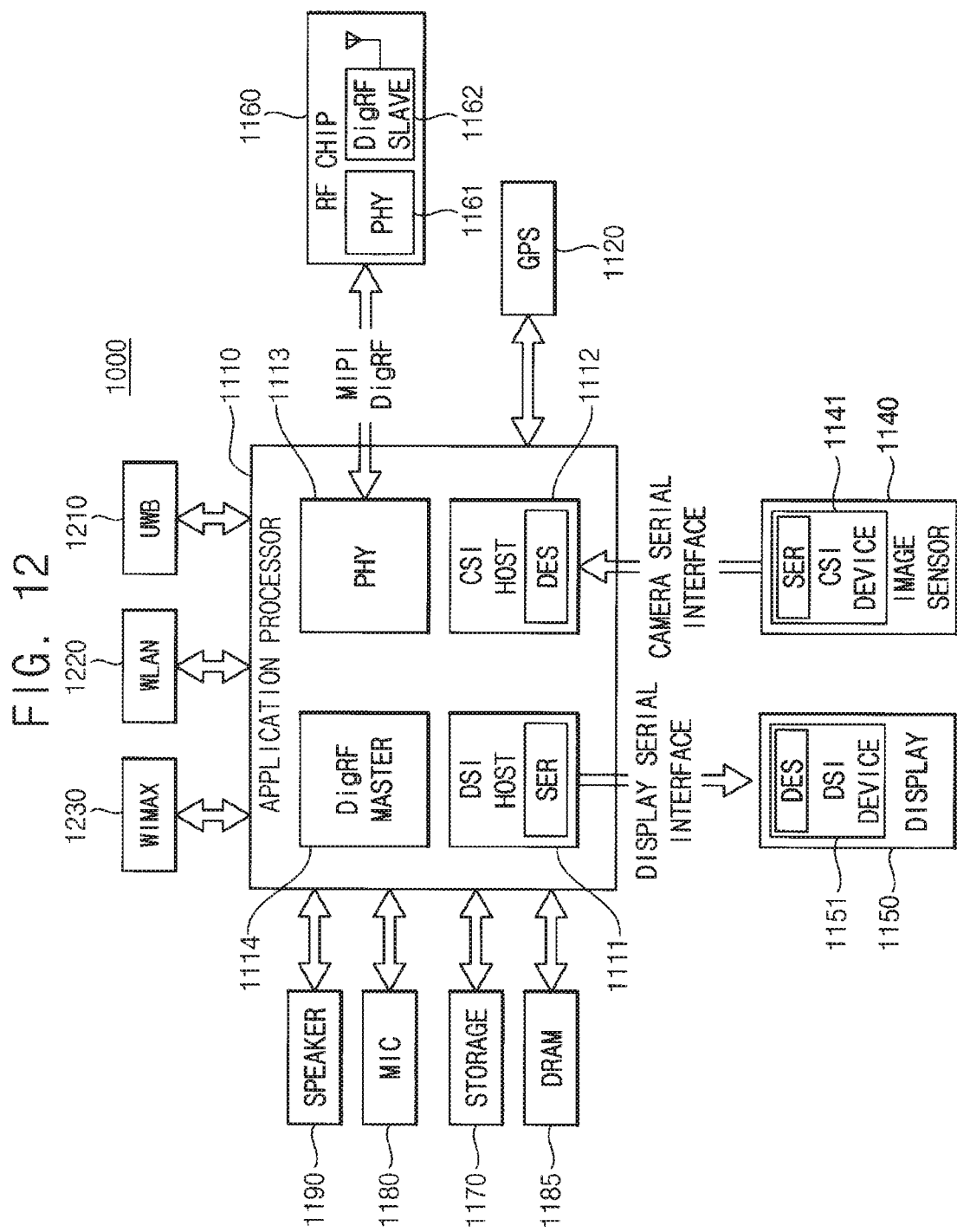
FIG. 12 is a block diagram illustrating an electronic system including an image sensor according to an exemplary embodiment of the inventive concept.

FIG. 12 is a block diagram illustrating an electronic system including an image sensor according to an exemplary embodiment of the inventive concept.

Referring to FIG. 12, an electronic system 1000 may be implemented as a data processing device that uses or supports a mobile industry processor interface (MIPI) interface. The electronic system 1000 may include an application processor 1110, an image sensor 1140, a display device 1150, etc. The electronic system 1000 may further include a radio frequency (RF) chip 1160, a global positioning system (GPS) 1120, a storage 1170, a microphone (MIC) 1180, a dynamic random access memory (DRAM) 1185, and a speaker 1190. In addition, the electronic system 1000 may perform communications using an ultra wideband (UWB) 1210, a wireless local area network (WLAN) 1220, a worldwide interoperability for microwave access (WIMAX) 1230, etc.

The application processor 1110 may be a controller or a processor that controls an operation of the image sensor 1140. The image sensor 1140 may be the image sensor according to exemplary embodiments of the inventive concept.

The application processor 1110 may include a display serial interface (DSI) host 1111 that performs a serial communication with a DSI device 1151 of the display device 1150, a camera serial interface (CSI) host 1112 that performs a serial communication with a CSI device 1141 of the image sensor 1140, a physical layer (PHY) 1113 that performs data communications with a PHY 1161 of the RF chip 1160 based on a MIN DigRF, and a DigRF MASTER 1114 that controls the data communications of the physical layer 1161. A DigRF SLAVE 1162 of the RF chip 1160 may be controlled through the DigRF MASTER 1114.

In exemplary embodiments of the inventive concept, the DSI host 1111 may include a serializer (SER), and the DSI device 1151 may include a deserializer (DES). In exemplary embodiments of the inventive concept, the CSI host 1112 may include a deserializer (DES), and the CSI device 1141 may include a serializer (SER).

The inventive concept may be applied to various electronic devices and electronic systems including the image sensor. For example, the inventive concept may be applied to systems such as a mobile phone, a smartphone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

In the image sensor and the method of operating the image sensor according to exemplary embodiments of the inventive concept, the test operation and the bias setting operation may be performed in real-time or during runtime while operating the image sensor, and thus the level of the well-bias voltage may be efficiently set to the optimized level. The image sensor may be driven based on the well-bias voltage having the optimized level, and thus the image sensor may have relatively low power consumption.

While the inventive concept has been shown and described with reference to exemplary embodiments thereof, it will be understood by those of ordinary skill in the art that various changes in form and details may be made thereto without departing from the spirit and scope of the inventive concept as set forth in the following claims.

What is claimed is:

1. An image sensor comprising:
   a pixel array configured to generate a plurality of analog pixel signals in response to incident light;
   a test pattern generator configured to generate a test pattern; and
   a plurality of column driving circuits configured to convert the plurality of analog pixel signals received from the pixel array into a first plurality of digital signals or to convert the test pattern into a second plurality of digital signals based on a selection signal,
   wherein the image sensor is configured to generate a test result pattern based on the second plurality of digital signals or image data based on the first plurality of digital signals, and
   wherein the image sensor is configured to convert the test pattern into the second plurality of digital signals using a first number of the plurality of column driving circuits in a first test mode and to convert the test pattern into the second plurality of digital signals using a second number of the plurality of column driving circuits in a second test mode.

2. The image sensor of claim 1, further comprising:
   a comparison logic configured to compare the test result pattern with the test pattern and to generate a determination signal.

3. The image sensor of claim 2, wherein each of the plurality of column driving circuits includes:
   a comparator configured to compare one of the plurality of analog pixel signals with a ramp signal to generate a comparison signal;
   a multiplexer configured to output the test pattern or the comparison signal in response to the selection signal; and
   a counter configured to generate one of the first plurality of digital signals or the second plurality of digital signals based on an output of the multiplexer.

4. The image sensor of claim 3, further comprising:
   a timing controller configured to transmit a well-bias voltage to the plurality of column driving circuits and to change a level of the well-bias voltage based on the determination signal.

5. The image sensor of claim 2, wherein each of the plurality of column driving circuits includes:
   a multiplexer configured to output the test pattern or one of the plurality of analog pixel signals in response to a selection signal;
   a comparator configured to compare an output of the multiplexer with a ramp signal to generate a comparison signal; and
   a counter configured to generate one of the first plurality of digital signals or the second plurality of digital signals based on the comparison signal.

6. The image sensor of claim 5, further comprising:
   a timing controller configured to transmit a well-bias voltage to the plurality of column driving circuits and to change a level of the well-bias voltage based on the determination signal.

7. An image sensor comprising:
   a pixel array configured to generate a plurality of analog pixel signals in response to incident light;
   a test pattern generator configured to generate a test pattern; and
   a plurality of column driving circuits configured to convert the plurality of analog pixel signals received from the pixel array into a first plurality of digital signals or to convert the test pattern into a second plurality of digital signals based on a selection signal;
   wherein the image sensor is configured to convert the test pattern into the second plurality of digital signals using a first number of the plurality of column driving circuits in a first test mode and to convert the test pattern into the second plurality of digital signals using a second number of the plurality of column driving circuits in a second test mode, and
   wherein the first number is different from the second number.

8. The image sensor of claim 7, wherein the image sensor is configured to convert the test pattern into the second plurality of digital signals using all of the plurality of column driving circuits in the first test mode.

9. The image sensor of claim 7, further comprising:
   a comparison logic configured to compare the second plurality of digital signals with the test pattern and to generate a determination signal to a timing controller.

10. The image sensor of claim 9, wherein the timing controller is configured to transmit a well-bias voltage to the plurality of column driving circuits and to change a level of the well-bias voltage based on the determination signal.

11. The image sensor of claim 10, wherein the timing controller is configured to increase the level of the well-bias voltage based on the determination signal.

12. The image sensor of claim 10, wherein the timing controller is configured to decrease the level of the well-bias voltage based on the determination signal.

* * * * *